May 13, 1930.  J. A. LELAND  1,758,261
TOOL AND ARTICLE HOLDER
Filed Jan. 15, 1923
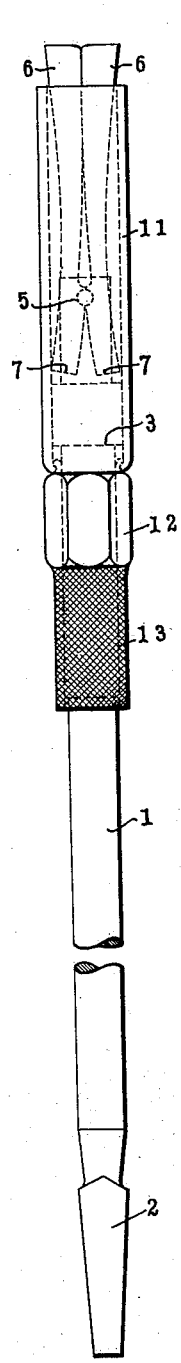
Fig.1
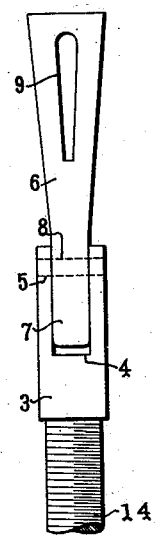
Fig.3
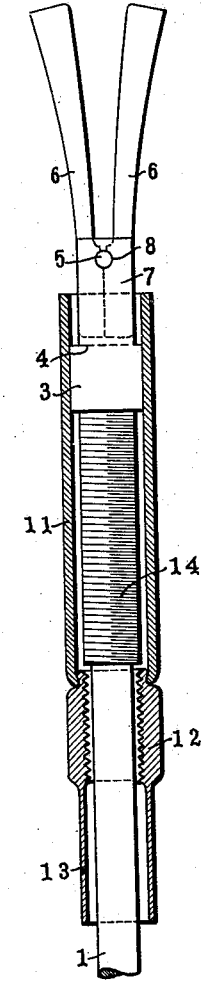
Fig.4
Fig.2
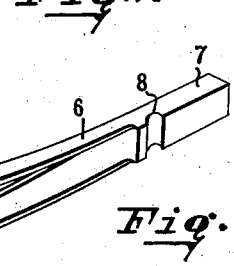
Fig.6
Fig.5
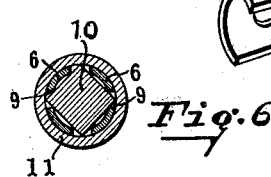
INVENTOR
John Addison Leland
BY
Duell, Warfield & Duell
ATTORNEY Patented May 13, 1930

1,758,261

UNITED STATES PATENT OFFICE

JOHN ADDISON LELAND, OF MILLERS FALLS, MASSACHUSETTS, ASSIGNOR TO MILLERS FALLS COMPANY, OF MILLERS FALLS, MASSACHUSETTS, A CORPORATION OF MASSACHUSETTS

TOOL AND ARTICLE HOLDER

Application filed January 15, 1923. Serial No. 612,586.

This invention relates to tool holders in the nature of chucks, and in its more specific aspects to jaws for gripping tool heads or other angular articles and to mechanism for supporting and operating such jaws.

An object of the invention is to provide a gripping jaw which will firmly and securely hold an angular article.

A further object is to provide gripping jaws of such a nature that the grasp of the jaws is distributed uniformly.

A still further object is to provide simple supporting and operating mechanism for gripping jaws whereby the jaws may be readily operated and from which they may be easily disengaged.

Another object is that of providing a chuck which will efficiently perform the purposes for which it is intended and which will also be economically and readily manufactured and assembled.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 is a front elevation of a tool chuck;

Fig. 2 is a view thereof taken partly in section to reveal the operating mechanism;

Fig. 3 is a view of a portion of the mechanism taken at right angles to Fig. 2;

Fig. 4 is a view of one of the gripping jaws looking from the inner side thereof;

Fig. 5 is a perspective view of the jaw; and

Fig. 6 is a section showing the jaws in engagement with an angular tool head.

The particular tool illustrated comprises a stem or shank 1, on one end of which is formed an angular tool head, which may be of any convenient type, and which in the form shown in the drawings consists of a squared portion 2 having sides which converge outwardly from the stem. At the end of the shank 1, opposite the angular head 2, there is in the present instance a head 3, which has formed therein a transverse notch or slot 4 and a pin 5 extends across this space and is adapted to strengthen the slotted end of the head 3 and to serve as a fulcrum for a pair of jaws 6—6, having in the construction shown squared shanks 7—7, which are adapted to extend into the slot 4, and to be disengaged therefrom, by displacing it laterally. Adjacent to the connection between the squared portion and the body of the jaw, each jaw has a transverse groove 8, for engaging the pin 5, and the jaws are so shaped on their inner faces that they may rock on the pin, as indicated in Figs. 1 and 2. On the opposite side of the notch 8 from the squared end 7, each jaw is curved transversely as shown, and the jaws are arranged with their concave faces adjacent. The curved portions of the jaws flare away from the groove, that is the radius of the arc upon which this portion of the jaw is curved gradually increases from the groove outwardly. Each jaw is longitudinally slotted at 9 intermediate its side edges, at the curved portion of the jaw, and the slot gradually increases in width toward the free end of the jaw, but stops short of the free end as shown. The shape of the jaws at the curved portions is such that when the jaws are gripped upon the square portion of a cutting bit shank, a cross-section of the jaws will be a true circle, as shown in Fig. 6. The slots 9 receive one angle of the square portion of the cutting bit 10, and from this results that each jaw grips the cutting bit shank in four places, and the jaws as a whole grip the shank in eight places, two at each face. Thus a very secure grip is obtained, and the shoulder formed between the square portion of the shank and the body thereof engages the outer ends of the slots 9, to prevent pulling of the cutting bit from the jaws, during the withdrawal of the bit. The cutting bit is thus held firmly both when entering and when withdrawing the cutting bit.

The jaws are clamped on the cutting bit shank and released therefrom, by a sleeve 11 which is mounted to move longitudinally of the shank. The sleeve is rotatably connected with a nut 12 which has a roughened extension 13 for convenience in manipulating the same and the nut is adapted to engage a threaded portion 14 of the shank, adjacent to the head. By means of the nut, the sleeve 11 may be moved longitudinally of the shank in either direction to close the jaws on the cutting bit, as indicated in Fig. 1, or to release the jaws as indicated in Fig. 2.

The jaws are supported by a single pin, and they are engaged with the pin by lateral displacement with respect to the head; that is by movement radial to the shank. With the end of the sleeve 11 level with the pin 8, there is no possibility of displacement of the jaws from the pin. The sleeve must be moved back into the position of Fig. 2, or farther, before the jaws will release from the pin. When the jaws are moved toward each other, they cooperate to form a socket, which gradually increases in cross-section toward the free ends of the jaws, and which when clamped upon the square portion of the bit shank form a true circle.

As many changes could be made in the above construction and many apparently widely different embodiments of this invention could be made without departing from the scope thereof, it is intended that all matter contained in the above description or shown in the accompanying drawings shall be interpreted as illustrated and not in a limiting sense.

It is also to be understood that the language used in the following claims is intended to cover all of the generic and specific features of the invention herein described, and all statements of the scope of the invention, which, as a matter of language, might be said to fall therebetween.

Having described my invention, what I claim as new and desire to secure by Letters Patent is:

1. A chuck, including, in combination, a pair of jaws, and means for moving and supporting the same, each of said jaws including an interiorly transversely- and longitudinally-curved body flared towards its outer end and being provided with a longitudinally-extending opening substantially centrally of its side edges and terminating short of the outer end of said body, the outer ends of the openings and the edge-portions of said openings and of said jaws constituting bit-shank-engaging elements.

2. A chuck, including a pair of jaws and means for mounting and moving the same, said jaws each including a body presenting a transversely curved inner face and being flared to its outer end to have side edge-portions extending at an angle to each other, each of said jaws being formed with an opening through its body of an increasing area towards the outer end of the same and terminating short of said outer end, the edges of said opening extending at angles to each other and to the side edges of said bodies whereby the shouldered shank of a tool associated with said chuck will have its shank engaged along four lines by the side edges of said body and opening, the shoulder of said shank being engaged by the end edge of said opening to prevent longitudinal movement of said shank with respect to the chuck.

In testimony whereof I affix my signature.

JOHN ADDISON LELAND.